(12) United States Patent
Gong et al.

(10) Patent No.: US 10,123,336 B2
(45) Date of Patent: Nov. 6, 2018

(54) RESOURCE ALLOCATION OPTIMIZATION METHOD FOR SIMULTANEOUS INFORMATION AND ENERGY TRANSFER SYSTEM

(71) Applicant: South University of Science and Technology of China, Guangdong (CN)

(72) Inventors: Yi Gong, Guangdong (CN); Zidong Han, Guangdong (CN)

(73) Assignee: S. University of Science and Technology of China, Guangdong (CN)

( * ) Notice: Subject to any disclaimer, the term of this patent is extended or adjusted under 35 U.S.C. 154(b) by 0 days.

(21) Appl. No.: 15/831,113

(22) Filed: Dec. 4, 2017

(65) Prior Publication Data

US 2018/0103479 A1 Apr. 12, 2018

Related U.S. Application Data

(63) Continuation of application No. PCT/CN2015/086140, filed on Aug. 5, 2015.

(30) Foreign Application Priority Data

Jul. 21, 2015 (CN) .......................... 2015 1 0431019

(51) Int. Cl.
*H04K 1/02* (2006.01)
*H04W 72/08* (2009.01)
(Continued)

(52) U.S. Cl.
CPC ............ *H04W 72/08* (2013.01); *H04B 17/24* (2015.01); *H04B 17/309* (2015.01);
(Continued)

(58) Field of Classification Search
CPC . H04W 72/08; H04W 52/367; H04W 52/143; H04W 52/245; H04W 72/0473;
(Continued)

(56) References Cited

U.S. PATENT DOCUMENTS

| 8,553,642 B2 * | 10/2013 | Li | H04L 1/0015 370/206 |
| 2012/0021757 A1 * | 1/2012 | Abgrall | H04W 52/241 455/452.2 |

FOREIGN PATENT DOCUMENTS

| CN | 104320219 A | 1/2015 |
| CN | 104469952 A | 3/2015 |

(Continued)

OTHER PUBLICATIONS

International Search Report, dated May 5, 2016, for corresponding international application PCT/CN2015/086140.
(Continued)

*Primary Examiner* — Dhaval Patel
(74) *Attorney, Agent, or Firm* — Myers, Wolin, LLC

(57) ABSTRACT

A resource allocation optimization method is provided for a Simultaneous Information and Energy Transfer (SIET) system. A baseband signal transmitted by a transmitting terminal of the system contain an information signal and an energy signals. The optimization method comprises a step P1 of determining a system pre-allocated parameter set, and solving steps for the step P1. The multicarrier broadband SIET optimization method disclosed is automatically configurable and feasible, giving consideration to both wireless energy supply and information transmission. The energy signal and the information signal are simultaneously and independently transmitted to the receiving terminal, therefore providing the energy required by the receiving terminal operating in a working mode. The method described can be widely applied into a variety of information and energy simultaneous transformation systems.

6 Claims, 1 Drawing Sheet

(51) Int. Cl.

| | |
|---|---|
| *H04W 52/24* | (2009.01) |
| *H04W 52/34* | (2009.01) |
| *H04W 72/04* | (2009.01) |
| *H04W 52/14* | (2009.01) |
| *H04W 52/36* | (2009.01) |
| *H04B 17/24* | (2015.01) |
| *H04B 17/309* | (2015.01) |
| *H02J 50/00* | (2016.01) |

(52) U.S. Cl.
CPC ....... *H04W 52/143* (2013.01); *H04W 52/245* (2013.01); *H04W 52/346* (2013.01); *H04W 52/367* (2013.01); *H04W 72/0453* (2013.01); *H04W 72/0473* (2013.01); *H02J 50/00* (2016.02)

(58) Field of Classification Search
CPC ............ H04W 72/0453; H04W 52/346; H04B 17/309; H04B 17/24; H02J 50/00

USPC ........ 375/296, 260, 267, 295, 316; 370/203, 370/204, 208, 209

See application file for complete search history.

(56) References Cited

FOREIGN PATENT DOCUMENTS

| | | |
|---|---|---|
| CN | 104734832 A | 6/2015 |
| CN | 104812078 A | 7/2015 |
| CN | 104836765 A | 8/2015 |
| WO | 2016149948 A1 | 9/2016 |
| WO | 2016149949 A1 | 9/2016 |

OTHER PUBLICATIONS

Zhao, Junhui, et al.;"Power Control Algorithm of Cognitive Radio Based on Non-Cooperative Game Theory"; China Communications, vol. /, No. /, Nov. 30, 2013 (Nov. 30, 2013), pp. 143-154.

* cited by examiner

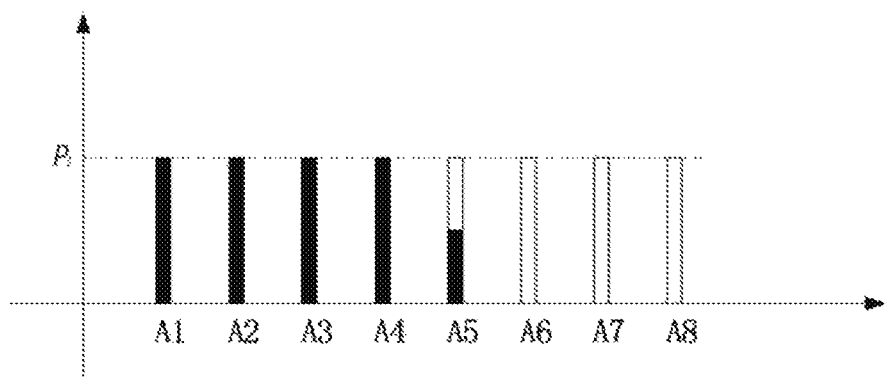

RESOURCE ALLOCATION OPTIMIZATION METHOD FOR SIMULTANEOUS INFORMATION AND ENERGY TRANSFER SYSTEM

CROSS REFERENCE TO RELATED APPLICATIONS

This application is a continuation under 35 U.S.C. § 120 of International Application PCT/CN2015/086140, filed Aug. 5, 2015, which claims priority to Chinese Application 201510431019.6, filed Jul. 21, 2015, the contents of each of which are incorporated by reference herein.

FIELD OF THE INVENTION

The present invention relates to an intersection of the wireless communication technology and the wireless power transmission technology, and in particular to a subcarrier power allocation method for a simultaneous information and energy transfer system.

BACKGROUND

The simultaneous wireless information and energy transfer, i.e., transferring information and energy simultaneously over a wireless network, is a new communication technology integrating the wireless communication technology with the wireless energy transmission technology. With the development of science and technology, the integration of the energy technology and the communication technology becomes a trend, which can not only realize a high-speed and reliable communication, but also effectively ease the pressure on scarcity of energy and spectrum, thereby having important application value in industry, medical treatment, infrastructure development, etc.

The Simultaneous Information and Energy Transfer (SIET) breaks through the traditional wireless communication means, it takes both the energy and information attributes into consideration and integrates the wireless communication technology with the wireless energy transfer technology, thus enabling a parallel and simultaneous transfer of information and energy and having wide application value and innovation significance.

The SIET may be used in various wireless terminals or devices which rely on batteries of limited capacity for power supply, the power fed to the wireless terminals or devices is harvested from wireless signal, thereby greatly prolonging standby time, decreasing device volume, lowering costs and reducing battery production significantly. Therefore, the pollution caused during manufacture and recycling of batteries is greatly reduced. Based on the characteristics of non-contact long-distance transmission, the power supply by batteries or cables can be replaced, and the convenience of the power supply is greatly improved. Based on the characteristics of stability and sustainability, the conventional way of harvesting environmental energy (such as wind energy, solar energy and kinetic energy) by energy harvesters can be replaced. Meanwhile, the simultaneous wireless information and energy transfer is widely applied in the improvement of people's life and brings about great social benefits. In the medical field, there is a serious problem of shortage of battery energy in implanting medical devices such as cardiac pacemakers and cardiovascular robots has a serious shortage problem, the assembly of the simultaneous wireless information and energy transfer can protect patients form severe secondary pains.

In the patent application documents "Transmitting System and Receiving System For Multicarrier Broadband Simultaneous Information and Energy Transfer System" (Application No. 201510133784.X), "Transmitting Method and Receiving Method For Simultaneous Information and Energy Transfer System" (Application No. 201510133428.8) and "Multicarrier Broadband Simultaneous Information and Energy Transfer Optimization Method" (Application No. 201510133789.2), the inventor(s) has (have) proposed a simultaneous information and energy transfer method, wherein baseband signals transmitted by the system contain information baseband signals and energy baseband signals, which are both simultaneously transmitted after being processed correspondingly, and sufficient electric energy is provided to a receiving terminal through the energy signals. The method can be widely applied in the digital communication and analog communication.

For the SIET systems, although the research direction has been proposed in the above SIET optimization methods, there is still no specific means capable of realizing automatic optimization and configuration of subcarriers of the SIET system.

SUMMARY

To solve the above technical problems, an objective of the present disclosure is to provide a feasible resource allocation optimization method for a SIET system, which is capable of automatically optimizing the configuration of the carrier channels of the information and power carrier signal.

A resource allocation optimization method for a Simultaneous Information and Energy Transfer (SIET) system, especially for a multicarrier broadband SIET system is disclosed. The SIET system is configured to, by a transmitting terminal, transmit a baseband signal comprising an information signal and an energy signal. The optimization method comprises the following a step of:

P1: determining, by the transmitting terminal and according to a first optimization target and a first constraint set, the optimal number $N_E^*$ of carriers for the energy signal and the optimal power $P_E^*$ for the energy signal.

The first optimization target is configured in such a way that: in case that the first constraint set is satisfied, the number $N_E^*$ of carriers of the energy signal is minimal and the power $P_E^*$ of the energy signal is minimal.

The first constraint set contains:

C1: the power Q collected by a receiving terminal is greater than or equal to a minimum power $P_{min}$ required by the receiving terminal in a current working mode, that is, $Q \geq P_{min}$;

C2: the energy $E^*[S^2_E(n)]$ of energy signal on each subcarrier channel is not greater than an energy limit $P_1$; and C3: the average power spectral density on each subcarrier frequency band is less than or equal to a predefined parameter value A.

The optimization method further comprises a solving procedure for step P1:

S11: ranking, depending upon channel quality, subcarrier channel parameters feedback in a descending order;

S12: calculating to determine whether the maximum power transmitted on a subcarrier channel which is ranked ahead depending upon the channel quality satisfies the constraint C1, when the constraints C2 and C3 are satisfied; if yes, proceeding to step S14; or otherwise, proceeding to step S13;

S13: superposing a next subcarrier channel ranked ahead and determining whether the maximum total power transmitted on the subcarriers superposed satisfies the constraint C1, when the constraints C2 and C3 are satisfied; if yes, proceeding to step S14; or otherwise, repeating step S13; and S14: recording the currently calculated number of subcarrier channels as the optimal number $N_E^*$ of carriers of the energy signal, and modulating the optimal power $P_E^*$ of the energy signal satisfying the constraint C1 onto $N_E^*$ subcarrier channels ranked ahead depending upon the channel quality.

Preferably, the resource allocation optimization method further comprises a step P2: based on the optimal number $N_E^*$ of carriers of the energy signal and the optimal power $P_E^*$ of the energy signal, by the transmitting terminal, obtaining the optimal number $N_I^*$ of carriers of the information signal and the optimal power $P_I^*$ of the information signal; and wherein, $N_I^* = N - N_E^*$ and $P_I^* = P - P_E^*$.

Preferably, the resource allocation optimization method further comprises a step P3: by a convex optimization algorithm, determining an optimal information signal power allocation set $\{E^*[S^2_I(n)]\}$ and an optimal information signal subcarrier allocation set $Sc_I^*$, wherein n=1, 2, ..., $N_I$.

Preferably, the resource allocation optimization method further comprises a step P4: determining an optimal information transmission rate $R^*$ according to the optimal information signal power allocation set $\{(E^*[S^2_I(n)]\}$ and the optimal information signal subcarrier allocation set $Sc_I^*$, and $$R^* = B_s * \sum_{n=1}^{N_I^*} \log_2\left(1 + \frac{|h_i|^2 E_i^*}{\sigma^2}\right);$$

wherein n=1, 2, ..., $N_I^*$, and $\sigma^2$ is an average noise power.

Preferably, the first constraint set further contains a constraint C4: the sum of energy signal power on subcarriers is less than or equal to the total power of the energy signal.

Preferably, in the constraint C1, the working mode of the receiving terminal comprises a normal working mode, an energy consumption mode and an energy storage mode.

The multicarrier broadband SIET optimization method provided is automatically configurable and highly feasible, taking into account of both wireless energy supply and information transfer. According to this disclosure, the independent energy signal is transmitted while the information signal is transmitted to the receiving terminal, therefore providing the energy required by the receiving terminal operating in a current working mode. In addition, the information signal and the energy signal are optimized by the optimization algorithm, so that the energy transmission efficiency as well as the information transmission rate can be increased.

The resource allocation optimization method described can be widely applied to a variety of SIET systems.

BRIEF DESCRIPTION OF THE DRAWINGS

The invention will be further described in detail by embodiments with reference to accompanying drawings, in which:

FIG. 1 is a schematic diagram of subcarrier channel resource allocation according to an embodiment.

DETAILED DESCRIPTION OF THE PREFERRED EMBODIMENTS

It is noted that the following embodiments in the present application and the features in the embodiments can be combined without any conflict.

A resource allocation optimization method for a Simultaneous Information and Energy Transfer system, especially for a multicarrier broadband SIET system, is provided. The SIET system comprises a transmitting terminal configured to transmit a baseband signal containing an information signal and an energy signal. For the baseband signal, the resource allocation optimization method comprise a step P1, specifically: determining the optimal number $N_E^*$ of carriers of the energy signal and the optimal power $P_E^*$ of the energy signal, by the transmitting terminal, and according to a first optimization target and a first constraint set. The first optimization target is as follows: in case that the first constraint set is made true, the number $N_E$ of carriers of the energy signals is minimal and the power $P_E$ of the energy signals is minimal. The first constraint set contains: C1: the power Q collected by a receiving terminal is greater than or equal to the minimum power $P_{min}$ required by the receiving terminal operating in a current working mode, that is, $Q \geq P_{min}$; C2: the energy of $E^*[S^2_E(n)]$ of energy signal on each subcarrier channel is not greater than an energy limit $P_1$, and; C3: the average power spectral density on each subcarrier frequency band is less than or equal to a defined parameter value A, that is, $E[S^2_E(n)]/B_s \leq A$, wherein $B_s$ is the bandwidth of channels on each subcarrier. The optimization method further comprises detailed solution steps for the step P1: S11: ranking the subcarrier channels, depending upon feedback subcarrier channel parameters, in a descending order in terms of channel quality; S12: calculating to determine whether the maximum power transmitted on a subcarrier channel ranked ahead in terms of channel quality satisfies the constraint condition C1 when the constraint conditions C2 and C3 are satisfied; if yes, proceeding to step S14; or otherwise, proceeding to step S13; S13: superposing a next subcarrier channel ranked ahead and determining whether the maximum total power transmitted on the subcarrier channels superposed satisfies the constraint condition C1 when the constraint conditions C2 and C3 are satisfied; if yes, proceeding to step S14; or otherwise, repeating step S13; and, S14: recording the currently calculated number of subcarrier channels as the optimal number $N_E^*$ of carriers of the energy signal, and modulating the optimal power $P_E^*$ of the energy signal satisfying the constraint condition C1 onto $N_E^*$ subcarrier channels ranked ahead in terms of the channel quality.

The energy limit $P_1$ satisfies the following relation: $P_1 = B_S P_S$, wherein $P_S$ is the maximum power spectral density of each subcarrier channel.

In a preferred embodiment, power, frequency spectrum and carriers can be calculated first at the transmitting terminal. It is assumed that the total power for the baseband signal of the transmitting terminal is P, the energy allocated to the information signal is $P_I$, and the total power allocated to the energy signal is $P_E$, and $P_I + P_E = P$. The total signal carrier set is Sc, and $Sc = Sc_E \cup Sc_I$, wherein $Sc_E$ is an energy signal subcarrier set and $Sc_I$ is an information signal subcarrier set. The energy harvested by the transmitting terminal is Q, and $Q = \beta P_E$, wherein $\beta$ is an energy efficiency coefficient. A channel parameter vector is $\underline{h}$, and $\underline{h} = [h_1, h_2 \ldots h_N]^T$. The total number of carriers is N and the number of carriers allocated to the information signals is $N_I$, and the number of carriers allocated to the energy signals is $N_E$, and $N=N_I+N_E$. The energy symbol for the information signal is $S_I(n)$, and the energy symbol for the energy signal is $S_E(n)$, wherein $n=1, 2, \ldots, m$, and $m \leq N$, and wherein $$S_I(n) = \begin{bmatrix} S_{I1} \\ \ldots \\ S_{Im} \end{bmatrix}, S_E(n) = \begin{bmatrix} S_{E1} \\ \vdots \\ S_{Em} \end{bmatrix},$$

$S_{I1} \sim S_{Im}$ are the first to $m^{th}$ information symbols for the information signal, and $S_{E1} \sim S_{Em}$ are the first to $m^{th}$ energy symbols for the energy signal. $E[S^2_I(n)]$ and $E[S^2_E(n)]$ represent the energy of the information signal and the energy of the energy signal, respectively. Therefore, the power Q harvested at the receiving terminal can be expressed by the following relation:

$$Q=<\underline{h},E[S^2_E(n)]>.$$

The power $P_E$ of the energy signal can be expressed by the following relation:

$$P_E = \sum_{n=1}^{N_S} E[S_E^2(n)].$$

The allocation of carriers and frequency spectra may be optimized according to the maximum energy required by the operation of the receiving terminal and the channel feedback information.

It is possible to monitor the channel feedback information after the signal is transmitted by the terminal transmits, and then to optimize the allocation of carriers and frequency spectra according to the minimum energy required by the operation of the receiving terminal and the channel feedback information (in this embodiment, the number of channels is equal to the number of carriers).

Preferably, the first optimization target in the step P1 is as follows: in case that the first constraint set is satisfied, the number $N_E$ of carriers of the energy signal is minimal and the power $P_E$ of the energy signal is minimal.

It is noted that, the minimum power required by the receiving terminal in operation, as mentioned in the constraint C1, should be interpreted as the minimum power required by the receiving terminal under multiple working modes. In this embodiment, in the constraint C1, the working mode of the receiving terminal comprises a normal working mode and a charge mode. For example, when the receiving terminal is in the normal working mode (a non-charge mode), the minimum power required by the receiving terminal can be the minimum power required by the circuit of the receiving terminal; and, when the receiving terminal is in the charge mode, the minimum power required by the receiving terminal is the sum of the minimum power required by the circuit of the receiving terminal and the power required by charging.

The method further comprises a step P2: based on the optimal number $N_E^*$ of carriers of the energy signal and the optimal power $P_E^*$ of the energy signal, obtaining the optimal number $N_I^*$ of carriers of the information signal and the optimal power $P_I^*$ of the information signal, by the transmitting terminal.

That is, a second optimization target in the step P2 is as follows: in case that a second constraint set is satisfied, the information transmission rate R is maximized.

A second constraint set is as follows: the sum of power of information signal on subcarriers is less than or equal to the total power of information signal in the baseband signal.

The first optimization parameter set in the step P1 comprises one or more of the following parameters: the energy signal subcarrier set $Sc_E$, the minimum power $P_{min}$ required by the receiving terminal in operation, the channel bandwidth $B_s$ of each subcarrier, the maximum average power spectral density $P_S$ of each subcarrier, and the channel parameter vector $\underline{h}$.

The second optimization parameter set in the step P2 comprises one or more of the following parameters: the information signal subcarrier set $Sc_I$, the number $N_I$ of subcarriers of the information signal, and the channel parameter vector $\underline{h}$, wherein $\underline{h}=[h_1, h_2 \ldots h_N]^T$.

A first pre-allocated parameter set comprises one or more of the following parameters: an energy signal subcarrier allocation set, an energy signal power allocation set, and the total power $P_E$ for energy signals.

A second pre-allocated parameter set comprises one or more of the following parameters: an information signal power allocation set, and an information signal subcarrier allocation set.

Resulting from the above, a system pre-allocated parameter set can be obtained by solving the following optimization problems.

Specifically, the first pre-allocated parameter set can be obtained based on the first optimization target and the first constraint set, as follows P1:
min_$\{\underline{h}, Sc_E, P_{min}, B, A\}P_E, N_E$, wherein elements in $\{\ \}$ represent the first optimization parameters;
s.t. (called a first constraint hereinafter):

$$Q=<\underline{h},E[S^2_E(n)]>,Q \geq P_{min};$$

$$\sum_{n=1}^{N_E} E[S_E^2(n)] \leq P_E;$$

$$E[S^2_E(n)]/B_S \leq P_S, n=1,2,\ldots,N_E.$$

The second pre-allocated parameter set can be obtained according to the second optimization target and the second constraint set, as follows.

P2:
max_$\{\underline{h}, Sc_E^*, Sc_I\}R$, wherein $Sc_E^*$ is an optimal energy signal subcarrier allocation set;
s.t. (called a second constraint hereinafter):

$$\sum_{n=1}^{N_I} E[S_I^2(n)] \leq P_I.$$

The steps for solving the optimization problems are as follows:

S11: ranking the feedback subcarrier channel parameters in a descending order in terms of channel quality;

S12: calculating to determine whether the maximum power transmitted over a subcarrier channel ranked ahead in terms of the channel quality satisfies the constraint C1 when the constraints C2 and C3 are satisfied as well; if yes, proceed to step S14; or otherwise, proceed to step S13;

S13: superposing a next subcarrier channel ranked ahead, and determining whether the maximum total power transmitted over the subcarrier channels superposed satisfies the constraint C1 when the constraints C2 and C3 are satisfied as well; if yes, proceed to step S14; or otherwise, step S13 is repeated;

S14: recording the currently calculated number of subcarrier channels as the optimal number $N_E^*$ of carriers of the energy signal, and modulating the optimal power $P_E^*$ of the energy signal satisfying the constraint C1 onto $N_E^*$ subcarrier channels ranked ahead in terms of the channel quality.

Based on the above methods and steps, the specific solution steps are as follows:

F1: initializing system parameter $Sc_E = \Phi$, Q=0, wherein $\Phi$ is a null set;

F2: initializing variables k=1, $Q_0$=0;

F3: calculating $Q_k = Q_{k-1} + |h_k|^2 * P_1$, and detecting whether $Q_k \geq P_{min}$ is true; if not, proceeding to step F4; or otherwise, proceeding to step F5, where $|h_k|^2$ is a module of the channel parameter vector $\underline{h}_k$;

F4: setting k=k+1, and looping the step S3; and

F5: allocating $P_1 = P_2 = \ldots = P_{k-1} = P_1$, $P_k = (Q_k - P_{min})/|h_k|^2$, and determining the optimal number $N_E^* = k$ of carriers of the energy signal, wherein $P_1$ to $P_{k-1}$ are the powers allocated and modulated to subcarrier channels A1 to A(k−1), and the optimal power of energy signals is as follows:

$$P_E^* = (N_E^* - 1) * P_1 + (Q_k - P_{min})/|h_{NE^*}|^2;$$

wherein $|h_{NE^*}|^2$ is a module of a channel parameter vector of the $(N_E^*)^{th}$ carrier channel.

For example, as shown in FIG. 1, eight subcarrier channels for a SIET signal are ranked in an order of A1 to A8 in terms of the channel quality. The bandwidth of each subcarrier channel is $B_s$, and the relations of the corresponding channel parameters are $|h_1|^2 \geq |h_2|^2 \geq \ldots \geq |h_N|^2$. Due to the limitation $E[S^2_E(n)]/B_s \leq A$ to the channel quality, for a subcarrier channel having better channel quality, the optimal allocation power is $E_n^* = AB_s = P_1$. The energy signal is first filled (modulated) into the subcarrier channel A1. If through calculation, even the subcarrier channel A1 is filled, the power of the energy signal still cannot satisfy the constraint C1, the energy signal is then filled into the subcarrier channel A2. By that analogy, if it is calculated that the power of the energy signal can satisfy the constraint C1 when the subcarrier channel A5 is filled, it is decided that 5 is the optimal number $N_E^*$ of carriers for the energy signal. The optimal power $P_E^*$ of the energy signal satisfying the constraint C1 is modulated into five subcarrier channels ranked ahead in terms of the channel quality. Further, through calculation, if the constraint C1 can be satisfied by the energy signal when the subcarrier channel A5 is filled by half, the other half bandwidth resource of the subcarrier channel A5 and the subcarrier channels A6 to A8 can be used for transmitting information signal.

The process of solving the optimization problem concerning the information transmission rate for the system is as follows:

$$\max\_\{\underline{h}, Sc_E^*, Sc_I\} R$$

s.t.

$$\sum_{n=1}^{N_I} E[S_I^2(n)] <= P_I.$$

By a convex optimization algorithm, an optimal information signal power allocation set $\{E^*[S_I^2(n)]\}$ and an optimal information signal subcarrier allocation set $Sc_I^*$ can be determined to eventually obtain an optimal information transmission rate $R^* = \text{argmax} R$, wherein n=1, 2, ..., $N_I$. The optimization method further comprises a solution step for the step P2: S21: $N_I^* = N - N_E^*$, and $P_I^* = P - P_E^*$.

The specific expression of $R^* = \text{argmax} R$ is as follows:

$$R^* = B_s * \sum_{n=1}^{N_I^*} \log_2\left(1 + \frac{|h_i|^2 E_i^*}{\sigma^2}\right);$$

wherein n=1, 2, ..., $N_I^*$, and $\sigma^2$ is an average noise power.

Preferably, in the constraint C1, the working mode of the receiving terminal comprises a normal working mode, an energy consumption mode (a speed-up power consumption mode) and an energy storage mode.

The multicarrier broadband SIET optimization method provided is automatically configurable and highly feasible, taking into account of both wireless energy supply and information transfer. The independent energy signal is transmitted while the information signal is transmitted to the receiving terminal, therefore providing the energy required by the receiving terminal operating in a working mode. In addition, the information signal and the energy signal are optimized by the optimization algorithm, so that the energy transmission efficiency as well as the information transmission rate can be increased. The method can be widely applied into a variety of information and energy simultaneous transformation systems.

Although the preferred embodiments of the present invention have been specifically described above, the present invention is not limited thereto. Those skilled in the art can make various equivalent deformations or replacements without departing from the spirit of the present invention, and these equivalent deformations or replacements shall fall into the scope defined by the claims of the present disclosure.

What is claimed is:

1. A resource allocation optimization method for a Simultaneous Information and Energy Transfer (SIET) system, especially for a multicarrier broadband SIET system, the SIET system being configured to, by a transmitting terminal, transmit a baseband signal comprising an information signal and an energy signal, the optimization method comprising the following steps of:

P1: determining, by the transmitting terminal and according to a first optimization target and a first constraint set, an optimal number $N_E^*$ of carriers for the energy signal and an optimal power $P_E$ for the energy signal;

wherein:

the first optimization target is configured in such a way that: in case that the first constraint set is satisfied, a number of $N_E$ carriers of the energy signal is minimal and a power $P_E$ of the energy signal is minimal; and the first constraint set contains:

C1: the power Q collected by a receiving terminal is greater than or equal to a minimum power $P_{min}$ required by the receiving terminal in a current working mode, that is, $Q \geq P_{min}$;

C2: the energy symbol $E^*[S_E^2(n)]$ of energy signal $S_E(n)$ on each subcarrier channel is not greater than an energy limit $P_1$; and C3: an average power spectral density on each subcarrier frequency band is less than or equal to a predefined parameter value A;

the optimization method further comprising:

S11: ranking, depending upon channel quality, subcarrier channel parameters feedback in a descending order;

S12: calculating to determine whether the maximum power transmitted on a subcarrier channel which is ranked ahead depending upon the channel quality satisfies the constraint C1, when the constraints C2 and C3 are satisfied; if yes, proceeding to step S14; or otherwise, proceeding to step S13;

S13: superposing a next subcarrier channel ranked ahead and determining whether the maximum total power transmitted on the subcarriers superposed satisfies the constraint C1, when the constraints C2 and C3 are satisfied; if yes, proceeding to step S14; or otherwise, repeating step S13; and S14: recording the currently calculated number of subcarrier channels as the optimal number $N_E^*$ of carriers of the energy signal, and modulating the optimal power $P_E^*$ of the energy signal satisfying the constraint C1 onto $N_E^*$ subcarrier channels ranked ahead depending upon the channel quality.

2. The resource allocation optimization method of claim 1, further comprising:

based on the optimal number $N_E^*$ of carriers of the energy signal and the optimal power $P_E^*$ of the energy signal, by the transmitting terminal, obtaining the optimal number $N_I^*$ of carriers of the information signal and the optimal power $P_I^*$ of the information signal; and wherein, $N_I^*=N-N_E^*$ and $P_I^*=P-P_E^*$, N is total number of carriers.

3. The resource allocation optimization method of claim 2, further comprising:

by a convex optimization algorithm, determining an optimal information signal power allocation set $\{E^*[S^2_I(n)]\}$ and an optimal information signal subcarrier allocation set $Sc_I^*$, wherein n=1, 2, . . . , $N_I$.

4. The resource allocation optimization method of claim 3, further comprising:

determining an optimal information transmission rate $R^*$ according to the optimal information signal power allocation set $\{E^*[S^2_I(n)]\}$ and the optimal information signal subcarrier allocation set $Sc_I^*$, wherein:

$$R^* = B_s * \sum_{n=1}^{N_I^*} \log_2\left(1 + \frac{|h_i|^2 E_i^*}{\sigma^2}\right);$$

wherein n=1, 2, . . . , $N_I^*$, $\sigma^2$ is an average noise power, B is the channel bandwidth of each subcarrier, $h_i$ is the channel parameter vector for the $i^{th}$ subcarrier channel and $E_i$ is the energy for the $i^{th}$ subcarrier channel.

5. The resource allocation optimization method of claim 1, wherein the first constraint set further contains:

C4: the sum of energy signal power on subcarriers is less than or equal to the total power of the energy signal.

6. The resource allocation optimization method of claim 1, wherein, in the constraint C1, the working mode of the receiving terminal comprises a normal working mode, an energy consumption mode and an energy storage mode.

* * * * *